United States Patent [19]

Mori et al.

[11] Patent Number: 5,664,827
[45] Date of Patent: Sep. 9, 1997

[54] SUN-ROOF DEVICE

[75] Inventors: Keiji Mori; Kenji Hori; Katsuaki Kadoike; Hiroyuki Yano, all of Aichi pref., Japan

[73] Assignee: Aisin Seiki Kabushiki Kaisha, Kariya, Japan

[21] Appl. No.: 715,250

[22] Filed: Sep. 19, 1996

Related U.S. Application Data

[63] Continuation of Ser. No. 425,045, Apr. 19, 1995, abandoned.

[30] Foreign Application Priority Data

Apr. 27, 1994 [JP] Japan .................. 6-090155

[51] Int. Cl.⁶ ......................................... B60J 7/00
[52] U.S. Cl. ................... 296/213; 296/214; 296/216
[58] Field of Search ........................... 296/213, 216, 296/214

[56] References Cited

U.S. PATENT DOCUMENTS

| | | | |
|---|---|---|---|
| 2,042,431 | 5/1936 | Hooper | 296/214 |
| 3,016,263 | 1/1962 | Rehmann | 296/214 X |
| 4,180,957 | 1/1980 | Rantala | 296/214 X |
| 4,293,161 | 10/1981 | Lutz | 296/213 |
| 4,923,245 | 5/1990 | Kuwabara | 296/216 X |
| 4,946,225 | 8/1990 | Jardin | 296/213 |
| 5,104,178 | 4/1992 | Bienert | 296/213 X |
| 5,186,517 | 2/1993 | Gilmore et al. | 296/214 |

FOREIGN PATENT DOCUMENTS

| | | |
|---|---|---|
| 460768 | 12/1991 | European Pat. Off. ........... 296/213 |
| 30 26 231 | 2/1984 | Germany . |
| 40 14 487 | 8/1991 | Germany . |
| 42 14 277 | 1/1995 | Germany . |
| 63-222925 | 9/1988 | Japan . |
| 4-71313 | 6/1992 | Japan . |
| 6-144014 | 5/1994 | Japan . |

*Primary Examiner*—Dennis H. Pedder
*Attorney, Agent, or Firm*—Burns, Doane, Swecker & Mathis, LLP

[57] ABSTRACT

A sun-roof device for use in a vehicle having a roof includes an open portion formed in the roof and having a pair of parallel spaced side peripheries each of which extends in a lengthwise direction of the vehicle. A frame is fixed to the roof so as to be located below the roof and has a pair of guide rails each of which extends along a side periphery of the opening portion. A movable panel is provided for opening and closing the opening portion and a pair of sliding members are connected to the movable panel for moving the movable panel. The sliding members are each guided in one of the guide rails so as to be slidable in the lengthwise direction of the vehicle, and a draining groove member for draining water on the frame is provided below the frame and separate from the frame.

21 Claims, 6 Drawing Sheets

SUN-ROOF DEVICE

This application is a continuation of application Ser. No. 08/425,045, filed Apr. 19, 1995 now abandoned.

FIELD OF THE INVENTION

The present invention relates to a sun-roof device for use in an automotive vehicle.

BACKGROUND OF THE INVENTION

A conventional sun-roof device is disclosed in Japanese patent Laid-open publication No.63(1988)-222925 published without examination on Sep. 16, 1988.

The sun-roof device includes an opening portion formed in a roof of the vehicle. The opening portion has a pair of parallel spaced side peripheries each of which extends in a lengthwise direction of the vehicle. A frame is fixed to the roof so as to be located below the roof. A guide rail extends along each of the side peripheries of the opening portion. Each guide rail is fixed to an upper face of the frame and is located on the frame.

A movable panel for opening and closing the opening portion is provided at the opening so as to be slidable in the lengthwise direction of the vehicle. A sliding member for moving the movable panel is guided in each of each guide rail so as to be slidable in the lengthwise direction of the vehicle.

A draining groove member separated from the frame is provided on the frame so as to be located at the same general height as the guide rails. The draining groove member can drain water in the draining groove into a plurality of drain pipes connected to the draining groove member.

However, in the above-described sun-roof device, it oftentime happens that water gets into the guide rails and such water in the guide rails can be quite problematic. For example, water in the guide rails can cause the sliding members to rush which may adversely affect their ability to smoothly move along the guide rails. Also, water that is in the guide rails can sometimes flow into the interior of the vehicle because no structure is provided to catch the water as it flows toward the ends of the guide rails.

SUMMARY OF THE INVENTION

A need exists, therefore, for a sun-roof device which addresses at least the foregoing drawbacks of the prior art.

In accordance with the present invention, a sun-roof device for use in a vehicle having a roof includes an opening portion formed in the roof and having a pair of parallel spaced side peripheries each of which extends in a lengthwise direction of the vehicle. A frame is fixed to the roof so as to be located below the roof and has a pair of guide rails each of which extends along a side periphery of the opening portion. A movable panel is provided for opening and closing the opening portion and a pair of sliding members are connected to the movable panel for moving the movable panel. The sliding members are each guided in one of the guide rails so as to be slidable in the lengthwise direction of the vehicle, and a draining groove member for draining water on the frame is provided below the frame and separate from the frame.

BRIEF DESCRIPTION OF THE DRAWING FIGURES

The foregoing and additional features of the present invention will become more apparent from the following detailed description of preferred embodiment thereof when considered with reference to the attached drawings, in which.

DETAILED DESCRIPTION OF THE PREFERRED EMBODIMENTS

Hereinafter a sun-roof device according to an embodiment of the present invention is explained with reference to FIG. 1 to FIG. 7.

Figure 1:
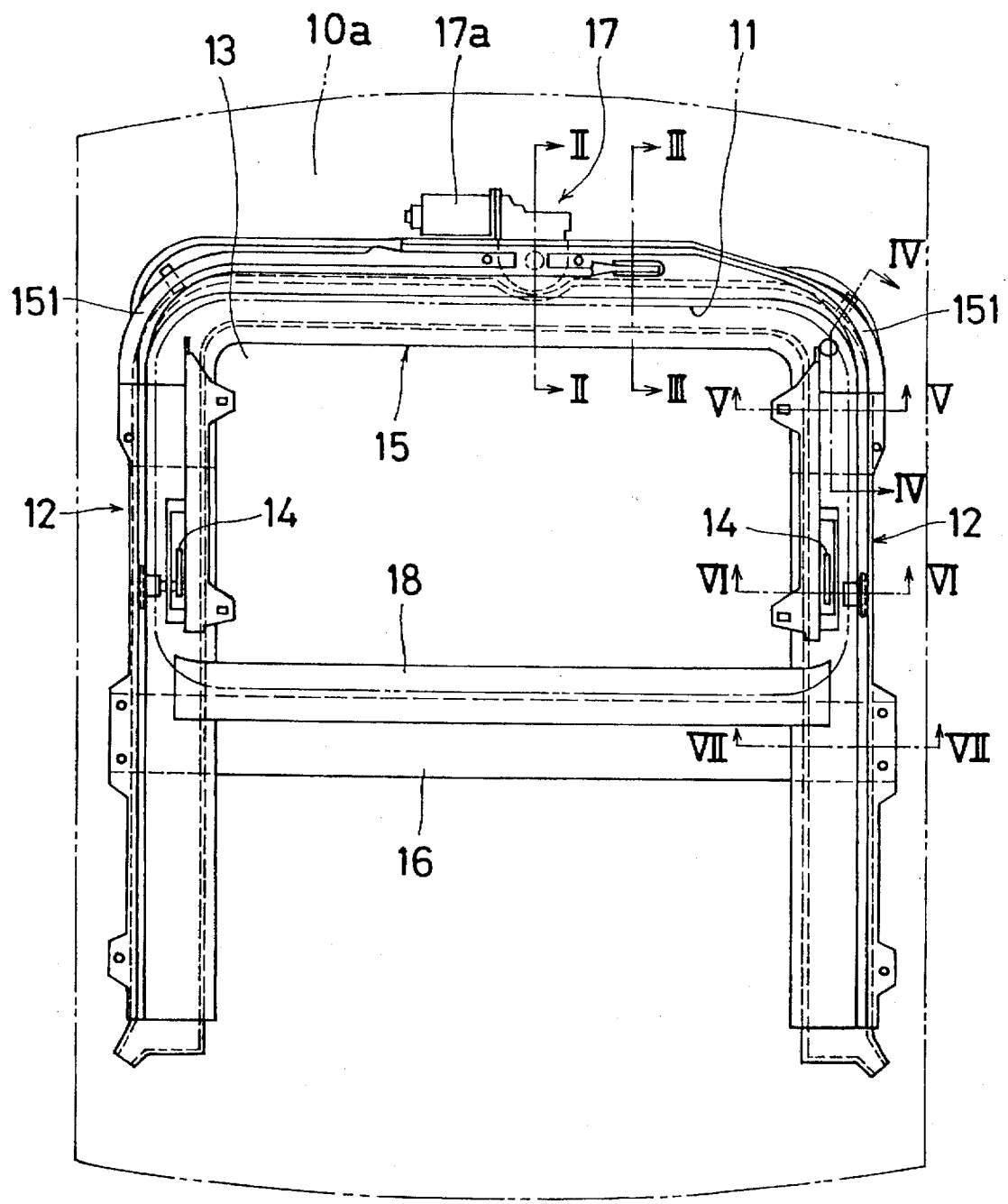
FIG. 1 is a plan view of a sun-roof device according to an embodiment of the present invention.

As shown in FIG. 1, an opening portion 11 is formed in a roof panel (a vehicle roof) 10a. A pair of side frames 12,12 made of metal material (e.g. aluminium) extend in the front to rear direction of a vehicle along opposite side peripheries of the opening portion 11. The side frames 12,12 are located parallel to each other and are fixed to the roof panel 10a. Hereinafter the side frame 12 on the right in FIG. 1 is referred to as a first side frame and the side frame 12 on the left in FIG. 1 is referred to as a second side frame.

A sliding panel 13 for opening/closing the opening portion 11 is supported by a pair of link members 14, 14 and is slidable toward the front and rear of the vehicle along the first and second side frames 12,12. One of the link members (hereinafter referred to as the first link member) 14 is guided in the first side frame 12 for sliding movement toward the front and rear of the vehicle. The other link member (hereinafter referred to as the second link member) 14 is guided in the second side frame 12 for sliding movement in the same direction as the first link member 14. Each link member 14 is composed of a shoe (shown in FIGS. 5 and 6) 14a and a link 14b.

A sliding gutter portion 18 is provided below the sliding panel 13 and is located along a rear periphery of the sliding panel 13. The sliding gutter portion 18 slides with the sliding panel 13. Water (e.g. rainwater) on the sliding panel 13 is received on the sliding gutter portion 18.

A front frame 15 made of metal material (e.g. iron) or Sheet Molding Compound (SMC) extends along a front periphery of the opening portion 11 and connects both front ends of the first and second side frames 12,12. A center frame (a reinforcing frame) 16 extends along a rear periphery of the opening portion 11 and connects both center portions of the first and second side frames 12,12. The center frame 16 reinforces the side frames 12,12. The side frames 12,12, the front frame 15, and the center frame 16 together define a frame.

A driving member 17 is fixed to the front frame 15 and is located in more a frontward position than the front periphery of the opening portion 11. The driving member 17 is disposed between the roof panel 10a and a vehicle ceiling 10b of the vehicle interior (not shown). The driving member 17 is connected to the first and second link members 14, 14 through a pair of cables 72,73. The driving member 17 includes of a motor 17a (shown in FIG. 1), a reduction gear 17b (shown in FIG. 2) and an output gear 17c (shown in FIG. 2). The reduction gear 17b and the output gear 17c are located in a housing 70. The output gear 17c of the driving member 17 is disposed between one of the cables (hereinafter referred to as the first cable) 72 and the other cable (hereinafter referred to as the second cable) 73. Each of the first and second cables 72,73 has a gear portion which is in meshing engagement with the output gear 17c of the driving member 17.

The first and second cables 72,73 are positioned below and guided by a guide plate 71 that is fixed to the front frame 15. The first and second cables 72,73 are movable in opposite directions to one another. One end of the first cable 72 is connected to the shoe 14a of the first link member 14 and the other end of the first cable 72 is free. One end of the second cable 73 is free and the other end of the second cable 73 is connected to the shoe (not shown) of the second link member 14.

Hereinafter the operation of the foregoing structure is explained. If the motor 17a of the driving member 17 is operated in one direction, the output gear 17c rotates in one direction (e.g. in the counterclockwise direction). This causes the first cable 72 to move in a first direction and the second cable 73 to move in a second direction opposite to the first direction. The shoe 14a of the first link member 14 which is connected to the first cable 72 is moved toward the rear of the vehicle along the first side frame 12 and the shoe of the second link member 14 which is connected to the second cable 73 is moved in the same direction as the shoe of the first link member 4 along the second side frame 12. As a result, the sliding panel 13 slides toward the rear of the vehicle, and the opening portion 11 is opened.

If the motor 17a of the driving member 17 is operated in the opposite direction, the output gear 17c rotates in the opposite direction (e.g. in the clockwise direction). This causes the first cable 72 to move in the second direction and the second cable 73 to move in the first direction. The shoe 14a of the first link member 14 which is connected to the first cable 72 is moved toward the front of the vehicle along the first side frame 12 and the shoe, of the second link member 14 which is connected to the second cable 73 is moved in the same direction as the shoe 14a of the first link member 14 along the second side frame 12. As a result, the sliding panel 13 slides toward the front of the vehicle, and the opening portion 2 is closed. When the opening portion 2 is closed by the sliding panel 13, the sliding panel 13 contacts the roof panel 10a via a seal member 50.

The first and second link members 14,14 also cause a rear portion of the sliding panel 13 to move upward and downward.

Figure 2:
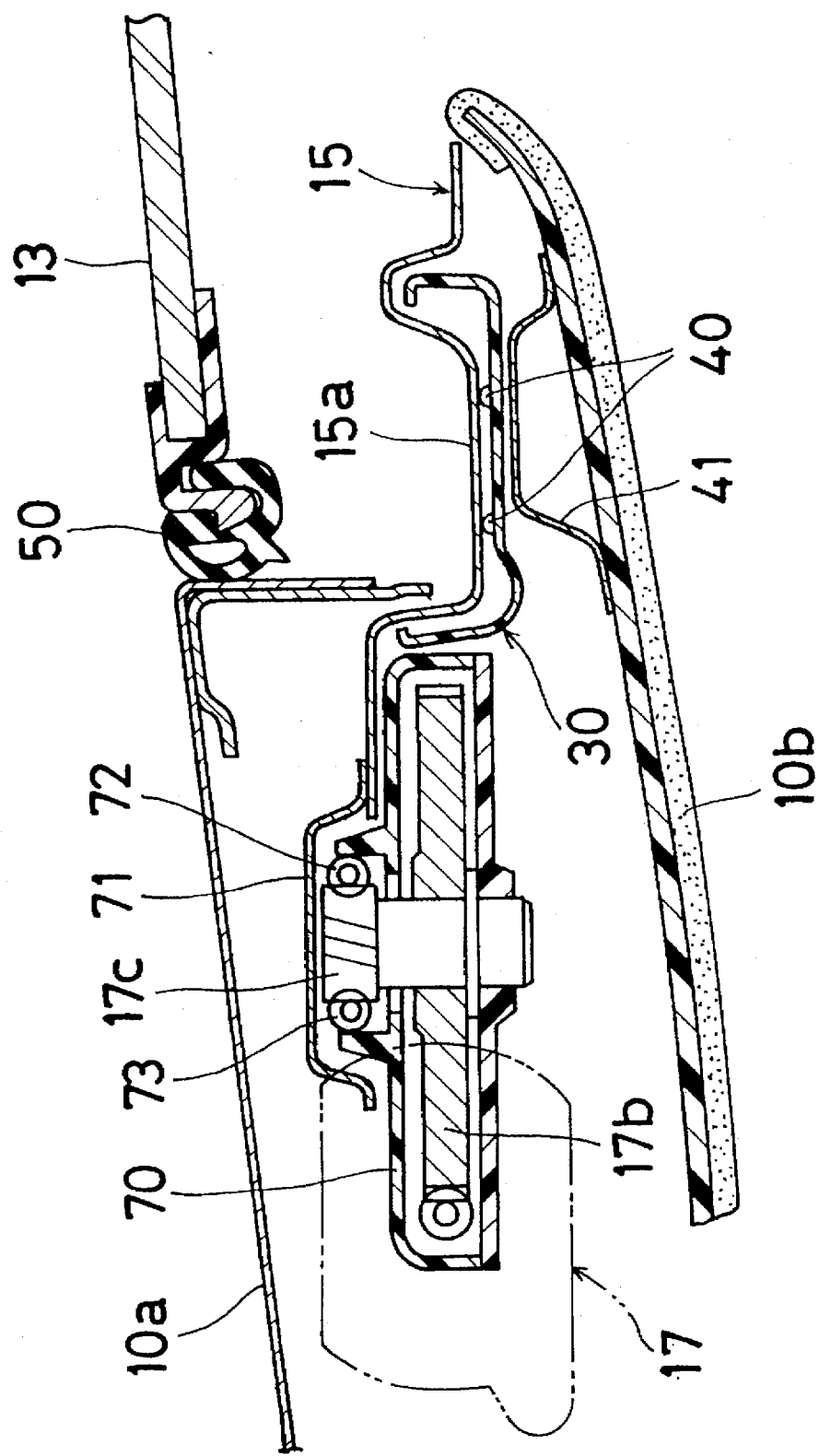
FIG. 2 is an enlarged cross-sectional view taken along the section line II—II in FIG. 1.

As shown in FIG. 1, the front frame 15 is substantially U-shaped and has a pair of corner portions 151,151. Further, as shown in FIG. 2, the front frame 15 has a first gutter portion 15a extending in the lengthwise direction of the front frame 15. The first gutter portion 15a is located below the front periphery of the opening portion 11.

Figure 4:
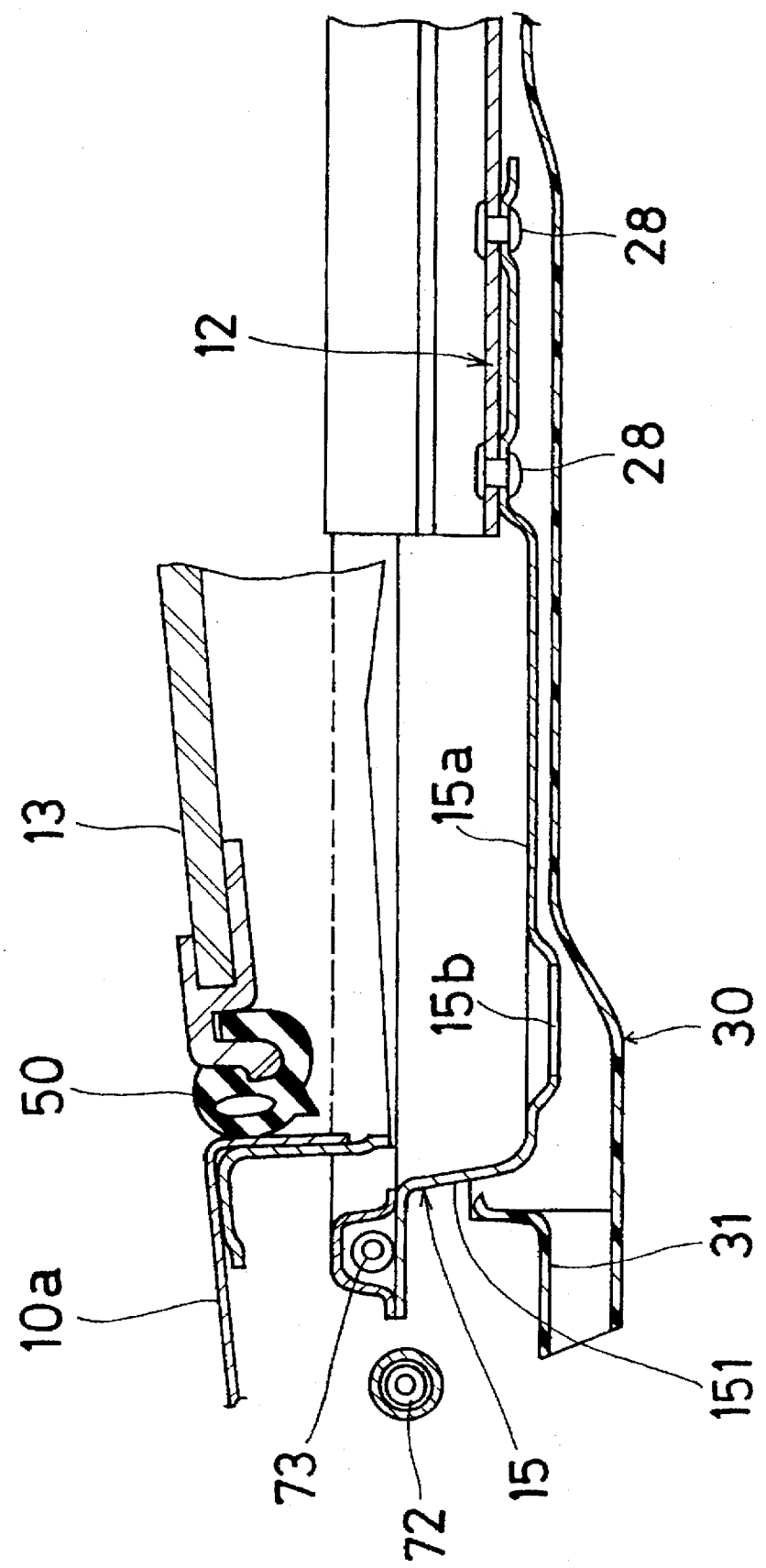
FIG. 4 is an enlarged cross-sectional view taken along the section line IV—IV in FIG. 1.
Figure 5:
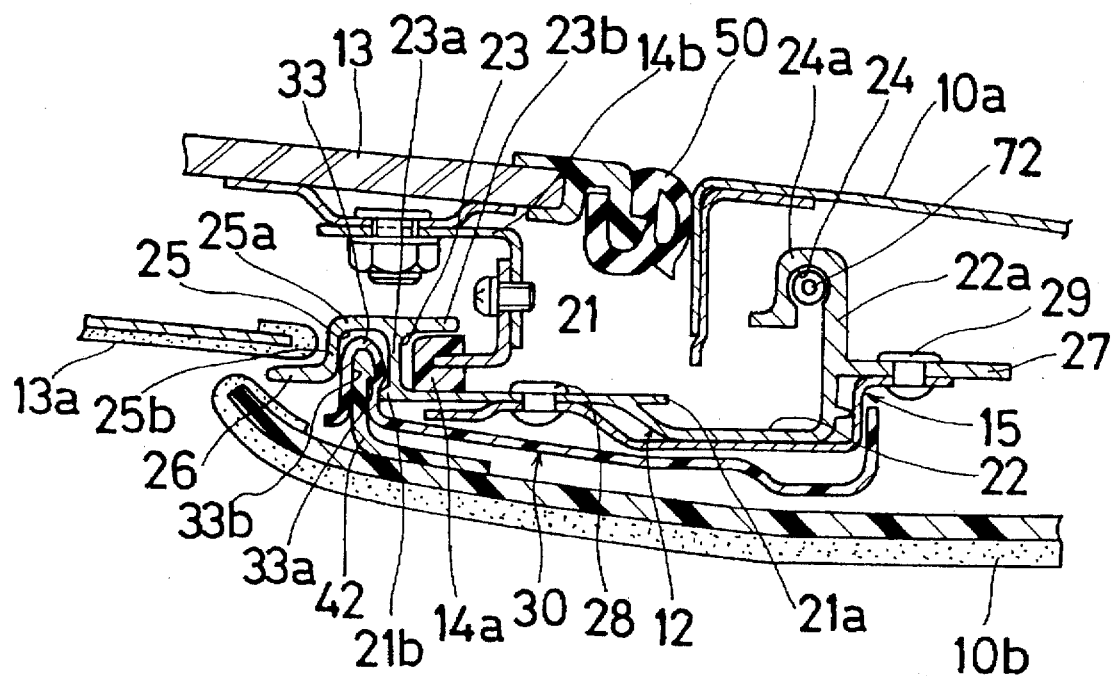
FIG. 5 is an enlarged cross-sectional view taken along the section line V—V in FIG. 1.

As shown in FIGS. 4 and 5, the first side frame 12 is fixed to the front frame 15 by a plurality of rivets 28,28,29 in such a manner that the front portion of the first side frame 12 overlaps with a portion of the front frame 15 that is located rearwardly of the corner portions 151. The second side frame 12 is also fixed to the front frame 15 by a pair of rivets (not shown) in such a manner that the front portion of the second side frame 12 overlaps with a portion of the front frame 15 that is located rearwardly of the corner portions 151.

Since the structure of the second side frame 12 is substantially the same as the structure of the first side frame 12, hereinafter only the structure of the first side frame 12 is explained.

Figure 6:
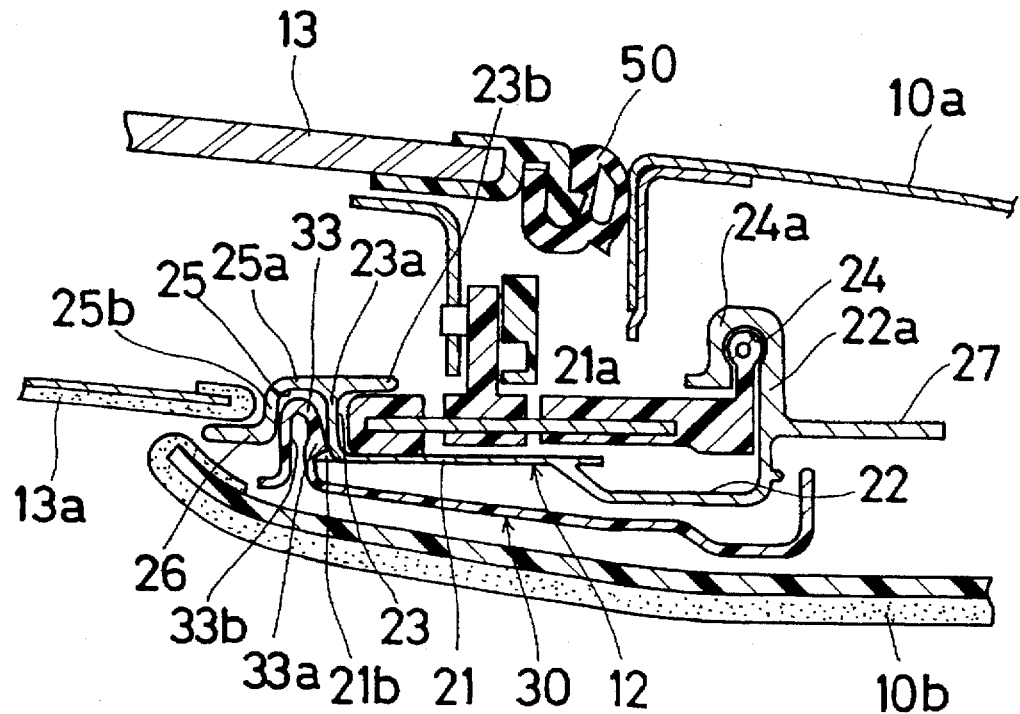
FIG. 6 is an enlarged cross-sectional view taken along the section line VI—VI in FIG. 1.
Figure 7:
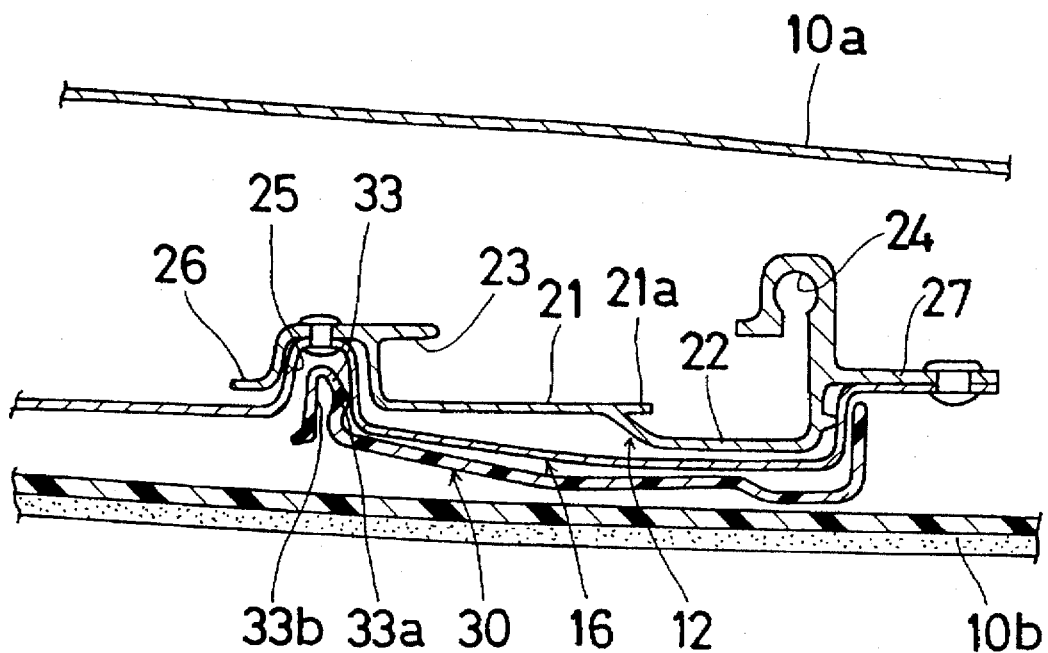
FIG. 7 is an enlarged cross-sectional view taken along the section line VII—VII in FIG. 1 according to a first embodiment of the present invention.

As shown in FIGS. 5 to 7, the first side frame 12 includes a flat portion 21, a second gutter portion 22, a first guide groove 23, a second guide groove 24, a supporting groove 25, a first flange portion 26, and a second flange portion 27.

A flange portion 21a disposed at one end of the flat portion 21 projects towards the second gutter portion 22. A small projection 21b disposed at an opposite end of the flat portion 21 projects in a opposite direction to the flange portion 21a. The flat portion 21 is fixed to the front frame 15 by the rivet 28.

The second gutter portion 22 extends in the lengthwise direction of the vehicle and is positioned below the right side periphery of the opening portion 11. Since the forward end of the first side frame 12 overlaps the portion of the front frame 15, the second gutter portion 22 is in communication with the first gutter portion 15a. The second gutter portion 22 is located more outwardly relative to the opening portion 11 than the flat portion 21 and is disposed below the flat portion 21. Thus, since the second gutter portion 22 is located lower than the flat portion 21, water (e.g. rainwater) in the flat portion 21 can flow into the second gutter portion 22. The flange portion 21a prevents water in the second gutter portion 22 from entering the flat portion 21.

The first and second guide grooves 23, 24 guide the first link member 14 in such a manner that the first link member 14 is slidable in the lengthwise direction of the vehicle. The first guide groove 23 is formed by a part of the flat portion 21, an upstanding wall 23a, and a flange portion 23b. The upstanding wall 23a is provided on the end portion of the flat portion 21. The flange portion 23b projects from a top of the upstanding wall 23a to overlie the part of flat portion 21. The first side frame 12 includes an upstanding wall 22a defining an outer boundary of the second gutter portion 22. The top of the upstanding wall 22a is bent to form a bending portion 24a that defines the second guide groove 24 which receives the first cable 72

The supporting groove 25 is formed by the upstanding wall 23a, a flange member 25a, and another flange member 25b. The flange member 25a projects from a top of the upstanding wall 23a. The flange member 25b projects downward from the inside end of the flange portion 25a.

The first flange portion 26 projects from a lower portion of the flange member 25b. An inner sliding panel 13a is guided by the first flange portion 26 and is slidable in the lengthwise direction of the vehicle.

The second flange portion 27 projects outward from the upstanding wall 22a. The second flange portion 27 is fixed to the front frame 15 by the rivet 29 and is also fixed to the roof panel 10a.

As shown in FIG. 7, one end of the center frame 16 is fixed to a lower face of the first side rail 12 by a pair of rivets. The other end of the center frame 16 is fixed to a lower face of the second side rail 12.

Figure 3:
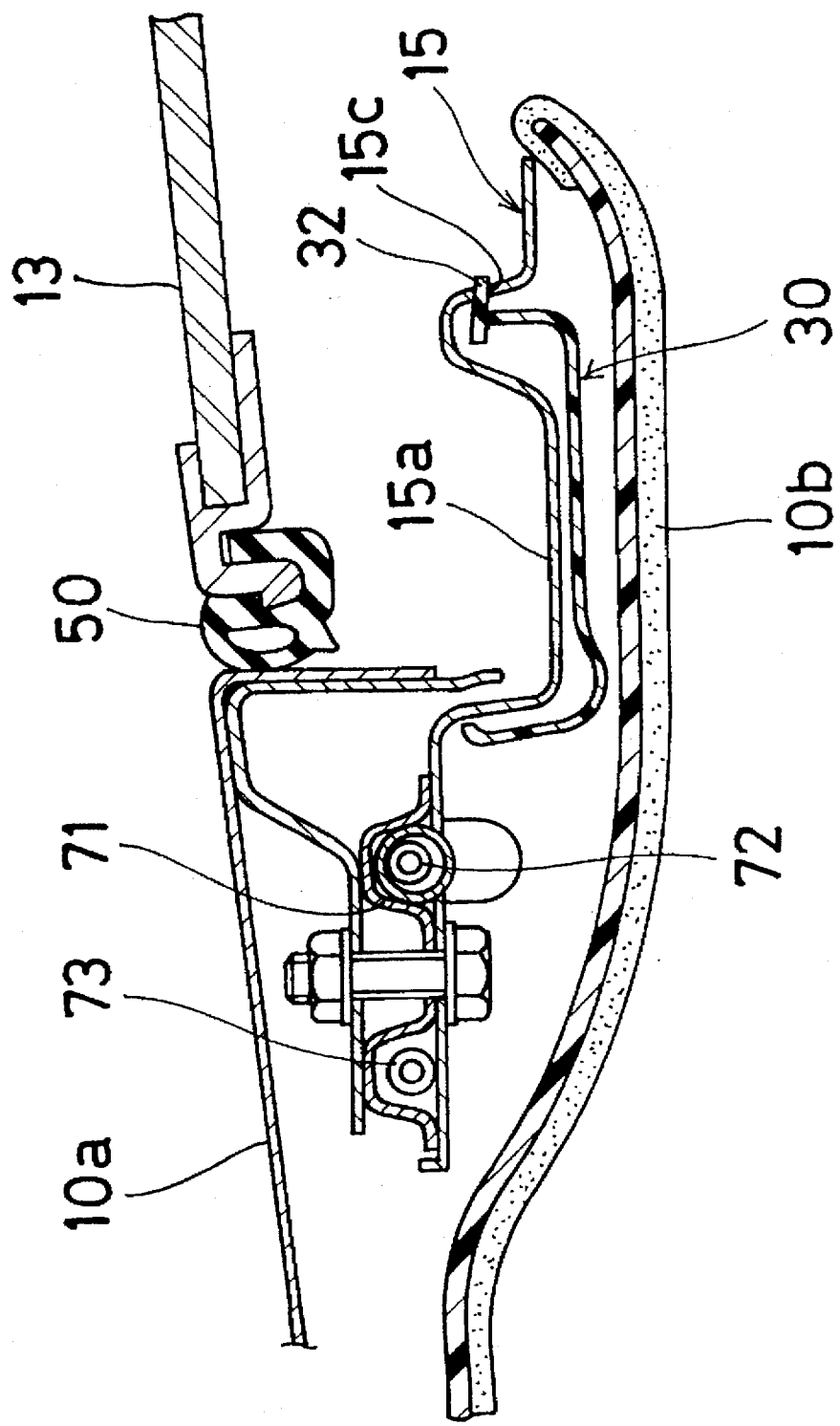
FIG. 3 is an enlarged cross-sectional view taken along the section line III—III in FIG. 1.

As shown in FIGS. 2 to 4, a draining groove member 30 is provided below the front frame 15 so as to cover substantially all areas of the lower face of the first gutter portion 15a of the front frame 15. In addition as shown in FIGS. 4 to 7, the draining groove member 30 is provided below the first side rail 12 so as to cover most or substantially all areas of a lower face of the first side rail 12. The draining groove member 30 is preferably a flexible member made of soft material (e.g. resin or rubber).

As shown in FIG. 4, one of a pair of drain ports 31 is integrally formed with the draining groove member 30 and is located at one corner portion of the draining groove member 30. The other drain port (not shown) is also integrally formed with the draining groove member 30 and is located on the other corner portion of the draining frame 30. Each drain port 31 is connected to a drain pipe (not shown). A hole 15b is provided in the first gutter portion 15a at each corner portion 151. The hole 15b leads water in the first gutter portion 15a to the draining groove member 30. The water in the draining groove member 30 flows into the drain ports 31.

As shown in FIG. 2, a pair of insert members 40, 40 are provided between the lower face of the first gutter portion 15a and the upper face of the draining groove member 30. The draining groove member 30 is supported by a support member 41 fixed to an upper face of the vehicle ceiling 10b. As shown in FIG. 3, a flange portion 32 projects from the draining groove member 30. The flange portion 32 is hung on a hole 15c of the front frame 15.

Figure 8:
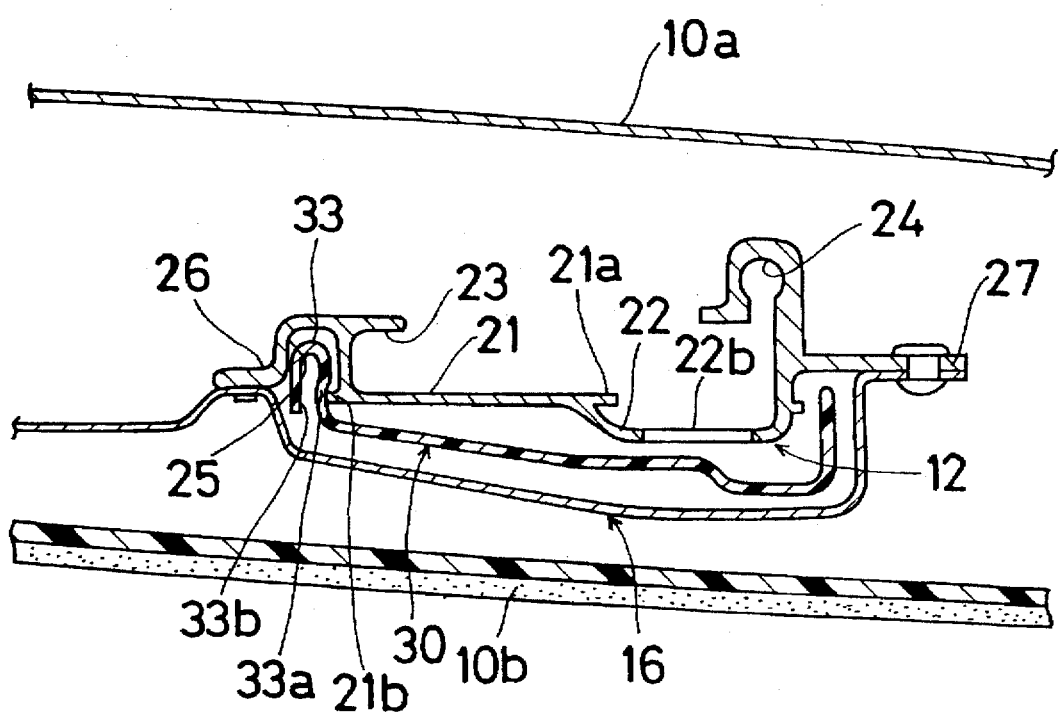
FIG. 8 is a cross-sectional view similar to FIG. 7 showing another embodiment of the present invention.

As shown in FIGS. 5 to 7, the draining groove member 30 covers all areas of a lower face of both the flat portion 21 and the second gutter portion 22. As shown in FIG. 5, the draining groove member 30 is located below the front frame 15 at the position where the first side frame 12 is connected to the front frame 15. As shown in FIG. 7, the draining groove member 30 is located below the center frame 16 in a position where the first side frame 12 is connected to the center frame 16. In accordance with an alternative arrangement shown in FIG. 8, the draining groove member 30 may be located between the first side rail 12 and the center frame 16 in a position where the first side rail 12 is connected to the center frame 16.

As shown in FIG. 5, a bending portion 33 is integrally formed with the draining groove member 30 and is supported in the groove 25 of the first side frame 12. The bending portion 33 has an engagement portion 33a which engages the projection 21b of the first side frame 12. As shown in FIG. 5, a clip 42 fixed to the vehicle ceiling 10b is supported in a concave area 33b of the bending portion 33. The clip 42 is substantially L-shaped.

Though the second gutter portion 22 is integrally formed as a part of the flat portion 21, the second gutter portion 22 may be separated from the flat portion 21. Though the first and second side frames 12,12 are separate from the front frame 15 in this embodiment, the side frames 12,12 may be integrally formed with the front frame 15. As shown in the alternative embodiment of FIG. 8, a hole 22b for leading water in the second gutter portion 22 into the draining groove member 30 may be provided in each second gutter portion 22. Alternatively, a plurality of holes may be provided in each second gutter portion 22 for the same purpose.

In this embodiment, since the draining groove member 30 is located below both side frames 12,12 and the front frame 15, water in the guide rails 23,24 as well as the first and second gutter portions 15a, 22 flows into the draining groove member 30, so that the water is prevented from entering the vehicle interior. In addition, because water in the guide rails 23,24 is able to flow into the second gutter portions 22, the water is not as likely to remain in the guide rails 23,24. Thus, the links 14b, 14b are not as likely to rust.

Further, since the draining groove member 30 covers the overlapping region of the side frames 12,12 and the front frame 15, the draining groove member 30 can prevent water at the front end of each side frame 12 from entering the vehicle interior via the rivets 28,28.

Further, since the draining groove member 30 is separate from the front and side frames 12,12,15, the frame is lighter than a frame with a draining groove member.

Further, since the draining groove member 30 is preferably a flexible member, the draining groove member 30 can conform to curvatures of the side frames 12,12. Thus, a common draining groove member can be used for all sun-roof devices whose areas are equal to each other.

Further, since the insert members 40,40 are disposed between the upper face of the draining groove member 30 and the lower face of the front frame 15, the insert members 40,40 can prevent the draining groove member 30 from contacting with the front frame 15. Thus, water on the draining groove member 30 located below the front frame 15 can be reliably drained.

Further, since the draining groove member 30 has the flange portion 32 hung on the hole 15c of the front frame 15, the draining groove member 30 is prevented from dropping down from the front frame 15.

Further, since the further grooves 25 are provided at each side frame 12 and the draining groove member 30 is supported in the further grooves 25, the draining groove member 30 is prevented from dropping down from each side frame 12.

The preferred embodiment described herein are therefore illustrative and not restrictive, the scope of the invention being indicated in the appended claims and all variations and changes, and equivalents thereof, which come within the meaning of the claims are intended be embraced therein.

What is claimed is:

1. A sun-roof device for use in a vehicle having a roof that is provided with an opening portion defined by a pair of spaced side peripheries extending in a lengthwise direction of the vehicle and a front periphery extending in a direction transverse to the lengthwise direction of the vehicle comprising:

a movable panel for opening and closing the opening portion of the vehicle;

sliding means connected to the movable panel for moving the movable panel in the lengthwise direction of the vehicle;

a frame that includes means for securing the frame to the roof at a location below the roof, said frame including a lower portion, a pair of side frames for extending along the side peripheries of the opening portion and a front frame for extending along the front periphery of the opening portion, the front frame being connected to the pair of side frames, each side frame including a guide rail portion which guides and on which rests the sliding means, the lower portion including at least one hole for draining water from the lower portion, the guide rail portion of each side frame being located elevationally higher than the lower portion so that water in the guide rail portions flows onto the lower portion, each side frame including a supporting channel, and a draining member separate from the frame and having an insert portion that is positioned and supported in the supporting channel of each side frame, the draining groove member being positioned below the frame, said hole in the lower portion providing communication between the lower portion and the draining member so that water in the lower portion drains into the draining member by way of the hole.

2. A sun-roof device as set forth in claim 1, including a space between at least a portion of said draining member and the frame.

3. A sun-roof device as set forth in claim 1, wherein the draining member extends along substantially the entirety of each side frame.

4. A sun-roof device as set forth in claim 1, wherein the draining member is a flexible member.

5. A sun-roof device as set forth in claim 1, wherein said hole is formed in the front frame.

6. A sun-roof device as set forth in claim 5, wherein the draining member has at least one drain port for allowing water on the draining member to be drained outside the vehicle.

7. A sun-roof device as set forth in claim 6, wherein the drain port integrally formed with the draining member.

8. A sun-roof device as set forth in claim 1, including an insert member disposed between an upper face of the draining member and a lower face of the frame for preventing the draining member from contacting the frame.

9. A sun-roof device as set forth in claim 1, wherein the draining member has a portion which is hung on the frame.

10. A sun roof device as set forth in claim 1, wherein the pair of side frames are separate from the front frame and are connected to the front frame by connecting means.

11. A sun-roof device as set forth in claim 1, wherein the front frame has a first gutter portion that is in communication with the lower portion so that water in the lower portion flows into the first gutter portion.

12. A sun-roof device as set forth in claim 11, wherein the draining member extends along substantially the entirety of the pair of side frames.

13. A sun-roof device as set forth in claim 12, wherein the draining member extends along substantially the entirety of the front frame.

14. A sun-roof device as set forth in claim 11, wherein said lower portion of the frame includes a second gutter portion extending along each side frame.

15. A sun-roof device as set forth in claim 14, wherein the hole is formed in the second gutter portion of one of the side frames, and including a hole formed in the second gutter portion of the other side frame.

16. A sun-roof device as set forth in claim 1, wherein each of the side frames includes a projection positioned adjacent the supporting channel and the insert portion of the draining member including an engagement portion which engages the projection on each side frame.

17. A sun-roof device as set forth in claim 12, wherein the frame includes a reinforcing frame fixed to the side frames for reinforcing the pair of side frames.

18. A sun-roof device as set forth in claim 12, wherein the draining member is located below the reinforcing frame.

19. A sun-roof device as set forth in claim 17, wherein the reinforcing frame is located below the draining member.

20. A sun-roof device for use in a vehicle having a roof that is provided with an opening portion defined by a pair of spaced side peripheries extending in a longitudinal direction of the vehicle, comprising:

a movable panel for opening and closing the opening portion of the roof of the vehicle;

a shoe connected to the movable panel;

a cable connected to the shoe;

driving means connected to the cable to move the panel for opening and closing the opening portion of the roof of the vehicle;

a frame that includes a pair of spaced apart side frames and a front frame that is connected to the pair of side frames, each side frame including a supporting channel one of the side frames including a first guide portion which receives the shoe, a second guide portion which receives the cable, and a gutter member extending between the first and second guide portions, said gutter member being provided with a hole;

a draining member separate from the frame and having an insert portion that is positioned and supported in the supporting channel of each side frame, the draining member being disposed below the frame, said hole in the gutter member communicating the gutter member with the draining member so that water in the gutter member drains into the draining member.

21. A sun-roof device as set forth in claim 20, wherein the gutter member includes a recessed gutter portion.

* * * * *